US012639451B2

(12) United States Patent
Rogers, III et al.

(10) Patent No.: US 12,639,451 B2
(45) Date of Patent: May 26, 2026

(54) SYSTEM AND METHOD FOR MONITORING SECURITY VULNERABILITIES IN SOFTWARE APPLICATIONS WITH THIRD-PARTY COMPONENTS

(71) Applicant: FUJIFILM Healthcare Americas Corporation, Lexington, MA (US)

(72) Inventors: James P. Rogers, III, Apex, NC (US); Peter Siber, Apex, NC (US)

(73) Assignee: FUJIFILM Healthcare Americas Corporation, Lexington, MA (US)

( * ) Notice: Subject to any disclaimer, the term of this patent is extended or adjusted under 35 U.S.C. 154(b) by 0 days.

(21) Appl. No.: 18/806,291

(22) Filed: Aug. 15, 2024

(65) Prior Publication Data

US 2026/0050674 A1    Feb. 19, 2026

(51) Int. Cl.
G06F 21/57 (2013.01)

(52) U.S. Cl.
CPC .................................. G06F 21/577 (2013.01)

(58) Field of Classification Search
CPC .................................................... G06F 21/577
See application file for complete search history.

(56) References Cited

U.S. PATENT DOCUMENTS

| | | | | |
|---|---|---|---|---|
| 9,081,967 | B2 * | 7/2015 | Pavlyushchik | ....... G06F 21/577 |
| 10,614,223 | B2 * | 4/2020 | Abramovsky | ........ G06F 21/577 |
| 11,809,575 | B1 * | 11/2023 | Reddy | ................... G06F 21/577 |
| 11,997,141 | B2 * | 5/2024 | Schutt | .................... H04L 63/04 |
| 2017/0169229 | A1 * | 6/2017 | Brucker | ................ G06F 21/566 |
| 2021/0021644 | A1 | 1/2021 | Crabtree et al. | |
| 2023/0222223 | A1 | 7/2023 | Lahmadi et al. | |

(Continued)

FOREIGN PATENT DOCUMENTS

| | | |
|---|---|---|
| CN | 117454385 A | 1/2024 |

OTHER PUBLICATIONS

Extended European Search Report for European Application No. 25163757.5 filed on Mar. 14, 2025, mailed on Sep. 9, 2025, European Patent Office, 15 pages.

*Primary Examiner* — J. Brant Murphy
(74) *Attorney, Agent, or Firm* — Woods Oviatt Gilman LLP; Dennis B. Danella, Esq.

(57) ABSTRACT

A method, system and computer program product for automatically and continuously monitoring security vulnerabilities in software applications with third-party components and reporting newly-discovered vulnerabilities in the third-party software components used by a software application is provided. The method includes receiving a software bill of materials (SBOM) including a plurality of third-party software components; automatically analyzing each of the plurality of third-party software components of the SBOM for known vulnerabilities and generating a first list of known vulnerabilities; storing the first list of known vulnerabilities; automatically analyzing, after a first period of time, each of the plurality of third-party components identified in the SBOM for newly-discovered vulnerabilities; storing a compiled second list of known vulnerabilities; comparing the compiled second list of known vulnerabilities with the original list of known vulnerabilities; and in response to the second list differing from the original list, transmitting, through a network, a notification identifying a set of differences in vulnerabilities between the second list and the original list.

21 Claims, 4 Drawing Sheets

(56)     References Cited

U.S. PATENT DOCUMENTS

| 2023/0289451 | A1* | 9/2023 | Mackenbach | G06F 21/577 |
| 2023/0315439 | A1* | 10/2023 | Castrejon, III | G06F 8/70 |
| | | | | 717/120 |
| 2023/0359745 | A1* | 11/2023 | Kilgallon | G06F 21/577 |
| 2023/0376605 | A1* | 11/2023 | Maheshwari | G06F 21/577 |
| 2023/0418949 | A1* | 12/2023 | Stocks | G06F 40/20 |
| 2024/0169062 | A1* | 5/2024 | Lee | G06F 21/554 |

* cited by examiner

SYSTEM AND METHOD FOR MONITORING SECURITY VULNERABILITIES IN SOFTWARE APPLICATIONS WITH THIRD-PARTY COMPONENTS

TECHNICAL FIELD

The present invention relates to the field of security vulnerability monitoring; and more particularly relates to a system and method for monitoring security vulnerabilities in software applications with third-party components.

BACKGROUND OF THE INVENTION

Modern software is written using third-party and open source components, woven together in varied and complex ways, and integrated with original code to provide a desired functionality. Third-party software components (e.g., commercially licensed, proprietary, and open source components) provide many of the building blocks that allow programmers to deliver value, improve quality, reduce risk and time-to-market when building software applications. These third-party software components are often open-source and are available through online repositories (e.g., NuGet for C #, NPM for NodeJS, and Maven Central for Java/Maven projects). The benefits of third-party software components are many. However, by using third-party software components, developers may need to take responsibility for maintaining and addressing issues that arise in relation to such components.

Software composition analysis (SCA) is a tool to assist in managing third-party components. SCA tools analyze custom-built software applications to detect embedded third-party software and detect if they are up-to-date, contain security flaws, or have licensing requirements. Using SCA, development teams can quickly track and analyze third-party components brought into a project. SCA tools can discover any related components, their supporting libraries, and their direct and indirect dependencies. SCA tools can also detect software licenses, deprecated dependencies, as well as vulnerabilities and potential exploits. After scanning the application, a software bill of materials (SBOM) is generated, providing a complete inventory of a project's software assets.

Due to the increasing and critical threat of cyber-attacks, it is imperative for a company with a software application including third-party software components to find out as soon as possible about newly-discovered vulnerabilities in third-party components used by the application. This allows the company to quickly analyze the vulnerabilities and determine if the components are used in a way that creates a vulnerability in the application itself.

Accordingly, there exists a need for improved methods and apparatuses for automatically and continuously monitoring security vulnerabilities in software applications with third-party components and reporting newly-discovered vulnerabilities in the third-party components used by a specified software application.

SUMMARY OF THE INVENTION

It is, therefore, an aspect of the present invention to provide a computer-implemented method for continuously monitoring for and reporting newly-discovered vulnerabilities in the third-party software components used in building a software application. The method includes: receiving a software bill of materials (SBOM) of the software application including a plurality of third-party software components; automatically analyzing each of the plurality of third-party software components of the SBOM for known vulnerabilities and generating a first list of known vulnerabilities; storing the first list of known vulnerabilities for the software application; automatically analyzing, after a first period of time, each of the plurality of third-party components identified in the SBOM for newly-discovered vulnerabilities; storing a compiled second list of known vulnerabilities for the software application; comparing the compiled second list of known vulnerabilities with the first list of known vulnerabilities; and in response to the compiled second list differing from the first list, transmitting, through a network, a first notification identifying a first set of differences in vulnerabilities between the compiled second list and the first list.

Another aspect of the present invention provides a computer system for continuously monitoring for and reporting newly-discovered vulnerabilities in the third-party software components used in building a software application. The system includes one or more computer processors; one or more computer-readable storage media; and program instructions stored on the computer-readable storage media for execution by at least one of the one or more processors.

The program instructions include program instructions to: receive a software bill of materials (SBOM) of the software application including a plurality of third-party software components; automatically analyze each of the plurality of third-party software components of the SBOM for known vulnerabilities and generating a first list of known vulnerabilities; store the first list of known vulnerabilities for the software application; automatically analyze, after a first period of time, each of the plurality of third-party software components of the SBOM for newly-discovered vulnerabilities; store a compiled second list of known vulnerabilities for the software application; compare the compiled second list of known vulnerabilities with the first list of known vulnerabilities; and in response to the compiled second list differing from the first list, transmit, through a network, a first notification identifying a first set of differences in vulnerabilities between the compiled second list and the first list.

Certain aspects of the present invention provide a computer program product for continuously monitoring for and reporting newly-discovered vulnerabilities in the third-party software components used in building a software application. The computer program product includes a computer readable storage medium having program code embodied therewith. The program code is executable by a processor to: receive a software bill of materials (SBOM) of the software application comprising a plurality of third-party software components; automatically analyze each of the plurality of third-party software components of the SBOM for known vulnerabilities and generating a first list of known vulnerabilities; store the first list of known vulnerabilities for the software application; automatically analyze, after a first period of time, each of the plurality of third-party software components of the SBOM for newly-discovered vulnerabilities; store a compiled second list of known vulnerabilities for the software application; compare the compiled second list of known vulnerabilities with the first list of known vulnerabilities; and in response to the compiled second list differing from the first list, transmit, through a network, a first notification identifying a first set of differences in vulnerabilities between the compiled second list and the first list.

Additional aspects, advantages and novel features of the present invention will be set forth in part in the description which follows and will in part become apparent to those in the practice of the invention, when considered with the attached figures.

BRIEF DESCRIPTION OF THE DRAWINGS

The present invention will now be described, by way of example, with reference to the accompanying drawings, in which.

Corresponding reference characters indicate corresponding parts throughout the several views. The exemplifications set out herein illustrate currently preferred embodiments of the invention, and such exemplifications are not to be construed as limiting the scope of the invention in any manner.

DETAILED DESCRIPTION OF THE INVENTION

Figure 1:
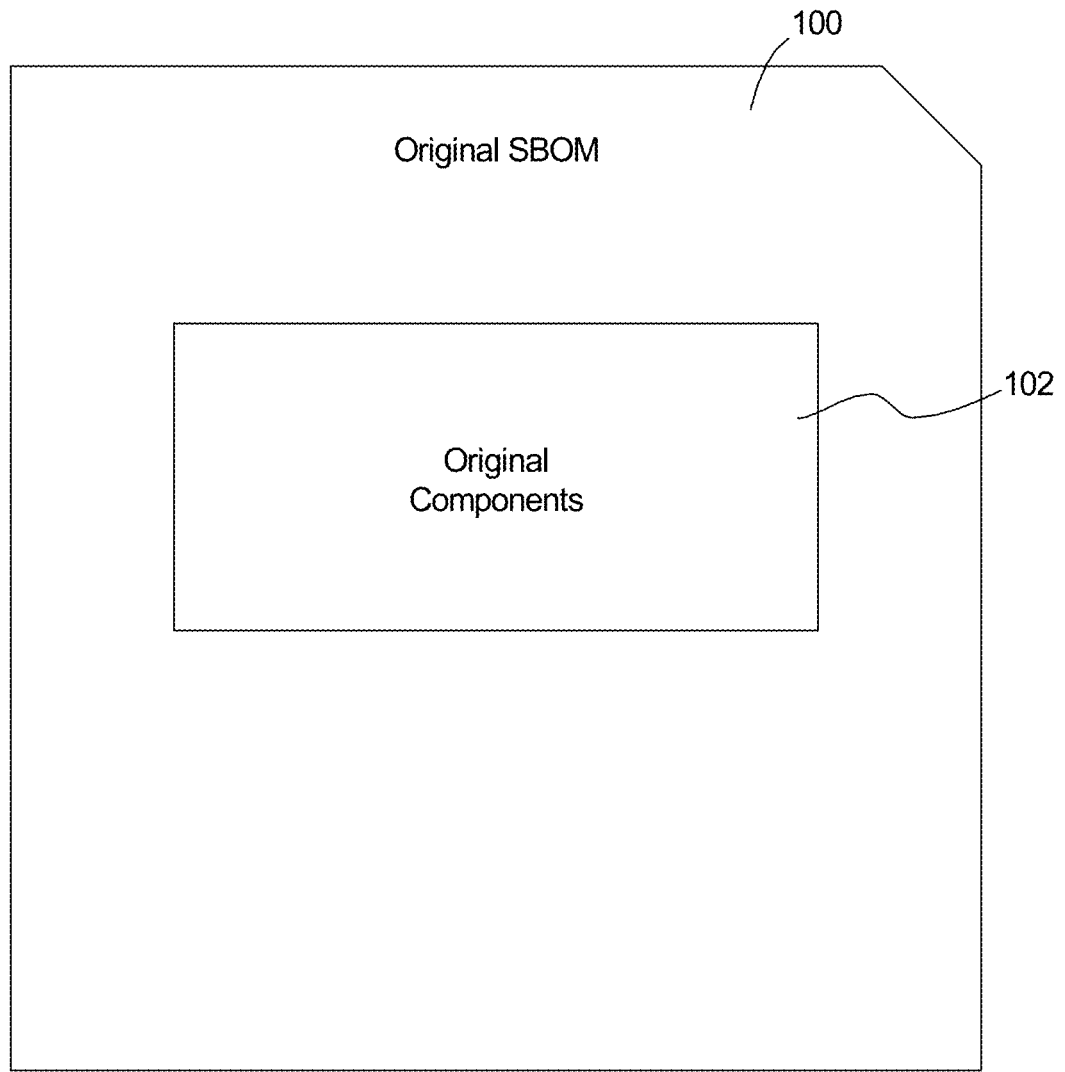
FIG. 1 is a block diagram illustrating a software bill of materials generated by software composition analysis, in accordance with some embodiments.

As will be appreciated by one skilled in the art, aspects of the present invention may be embodied as a system, method or computer program product. Accordingly, aspects of the present invention may take the form of an embodiment made entirely of hardware, an embodiment made entirely of software (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

It is not unusual in software engineering to develop software by using different software components. Using software components divides the complex code of larger elements into smaller pieces of code, thereby increasing coding flexibility by enabling easier reuse of components when addressing new needs. Third-party software components (e.g., commercially licensed, proprietary, or open source components) often provide many of the building blocks that allow programmers to deliver value, improve quality, reduce risk and time-to-market when building software applications. These third-party software components are often open-source and available through online repositories. However, using third-party software components introduces many risks for the software applications being developed. For example, using third-party software components introduces risks of changes introduced by new versions, risks of vulnerabilities in components, risks of Intellectual property (IP) legal requirements, risks of compatibility between existing codebase and third-party software components, and risks of poor documentation and obsolete software components.

Traditional attempts to manage the risks associated with third-party software components used manual entry on spreadsheets and documents to track all the third-party software components used by their developers. However, when using third-party software components extensively, there is a need to automate the analysis and management of risks associated with third-party software components.

Software Composition Analysis (SCA) helps manage the risks associated with third-party software components. SCA attempts to detect all the third-party components in use within a software application to help reduce risks associated with security vulnerabilities, IP licensing requirements, and obsolescence of components being used. SCA begins with an analysis engine scanning the software source code, and the associated artifacts used to compile a software application. The analysis engine identifies the third-party software components and their versions and stores this information in a database, thereby creating a catalog of third-party software components in use in the scanned application. This catalog can then be compared to databases referencing known security vulnerabilities for each third-party software component, the licensing requirements for using the third-party software component, and the historical versions of the third-party software component. For security vulnerability detection, this comparison may be made, for example, against known security vulnerabilities (CVEs) that are tracked in the National Vulnerability Database (NVD) maintained by the United States National Institutes of Standards and Technology, a Sonatype open source security (OSS) index, a GitHub Security Advisories (GHSA) database, a Snyk vulnerability database, or a common vulnerabilities and exposures (CVE) database.

The results of the SCA are then made available to end users using different digital formats. The content and format depend on the SCA tool that is used and may include guidance to evaluate and interpret the risk, and recommendations especially when it concerns the legal requirements of third-party software components such as strong or weak copyright licensing. The output may also contain a Software Bill of Materials (SBOM) detailing all the open source components and associated attributes used in a software application.

With reference to the drawings, and initial to FIG. 1, an exemplary block diagram illustrating a software bill of materials generated by software composition analysis, in accordance with some embodiments is provided. A Software Bill of Materials (SBOM) 100 may be created by one or more SCA software tools. The SBOM 100 may include a catalog of third-party software components 102 used by an application.

While performing a SCA generates an SBOM and identifying known vulnerabilities can help manage the risks associated with third-party software components, it is not unusual for new vulnerabilities to be discovered after creation of the SBOM and an initial vulnerabilities analysis. Accordingly, embodiments of the present invention employ a security vulnerability monitor to automatically and continuously monitor security vulnerabilities in software applications with third-party software components and report newly-discovered vulnerabilities in the third-party components used by a specified software application.

Figure 2:
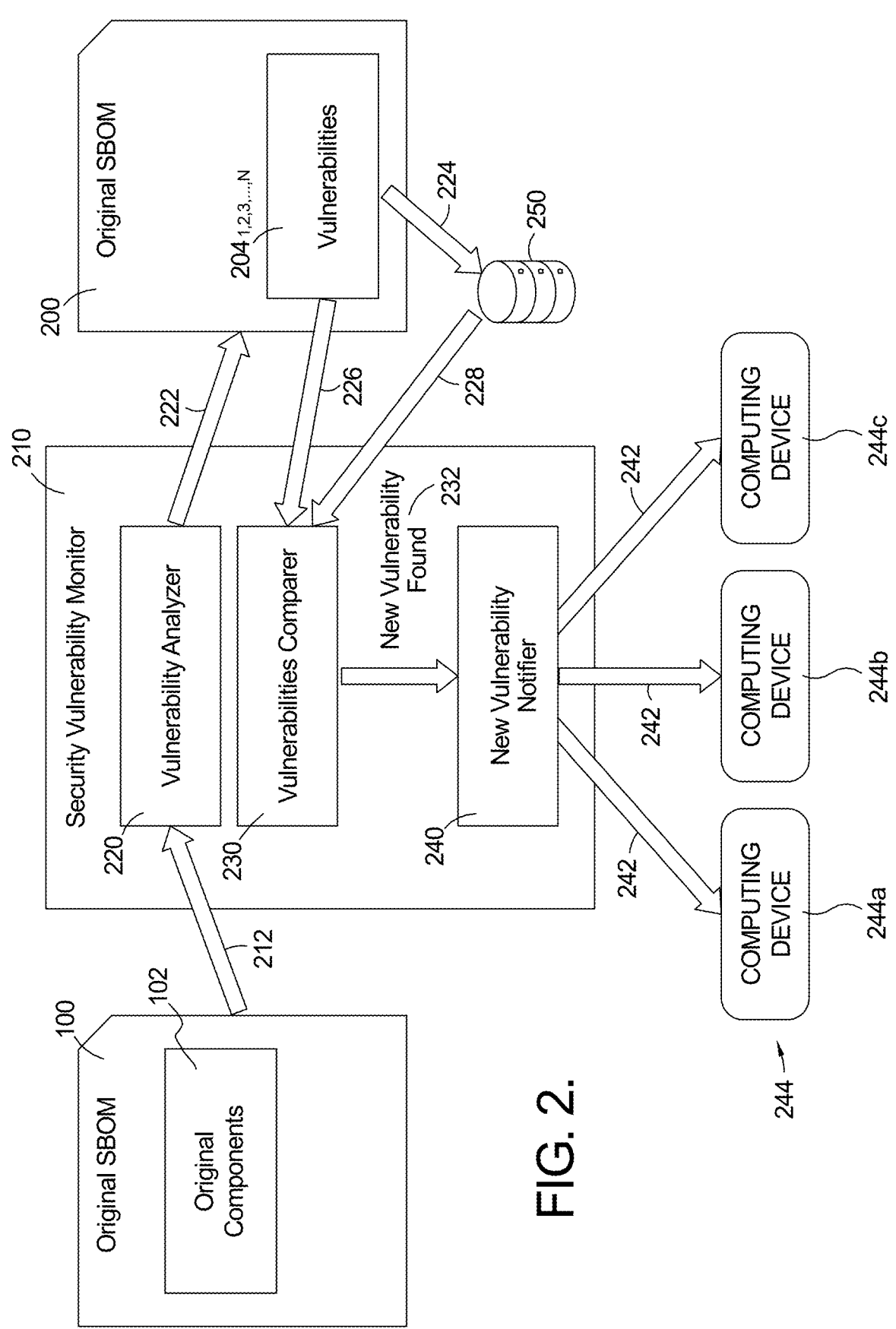
FIG. 2 is a block diagram illustrating a securities vulnerability monitor analyzing vulnerabilities based on a software bill of materials, in accordance with some embodiments.
Figure 3:
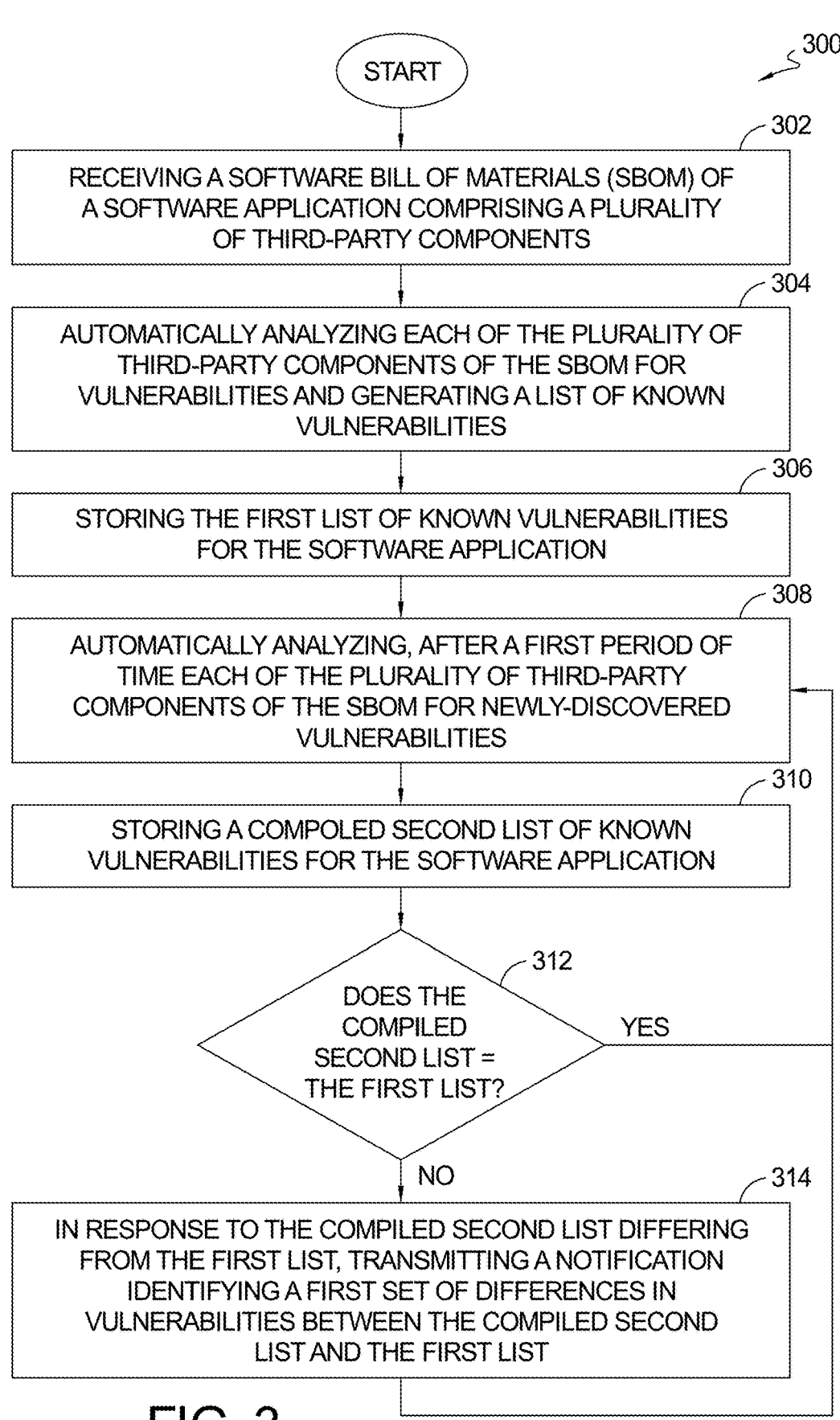
FIG. 3 is a flow chart depicting operational steps of securities vulnerability monitor, on securities vulnerability monitor, in accordance with certain embodiments.

An exemplary embodiment of the present invention will hereafter be described with respect to the block diagram set forth in FIG. 2 illustrating a securities vulnerability monitor 210 analyzing vulnerabilities based on a software bill of materials, in combination with the flow chart provided in FIG. 3 depicting operational steps of securities vulnerability monitor. Furthermore, exemplary components of the one or more computing devices executing the information processing program in accordance with the exemplary embodiment is set forth in FIG. 4.

Figure 4:
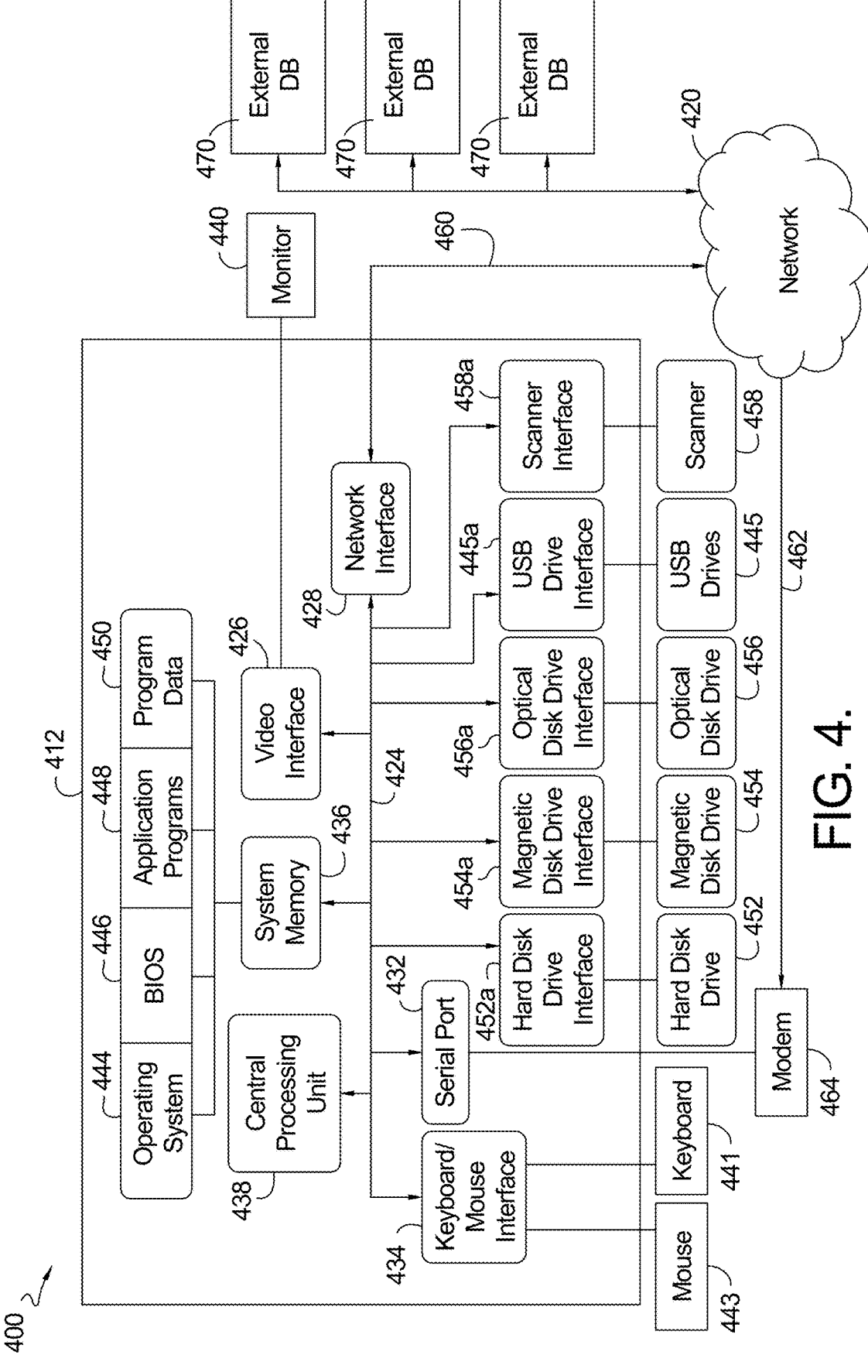
FIG. 4 depicts a block diagram of components of the computing devices executing the information processing program, in accordance with some embodiments.

With reference to FIGS. 2-4, operational steps 300 of a security vulnerability monitor 210 may begin at step 302, with security vulnerability monitor 210 receiving 212, from an SCA tool, software bill of materials (SBOM) 100 comprising an identification of the plurality of third-party software components 102.

At step 304, a vulnerability analyzer 220 of security vulnerability monitor 210 automatically analyzes each of the plurality of third-party components of the received SBOM for known vulnerabilities, thereby producing 222 a first list of known vulnerabilities 2041. Types of vulnerabilities identified in the list of known vulnerabilities 2041 may include, but are not limited to, security configuration vulnerabilities, network vulnerabilities, operating system vulnerabilities, process/procedural vulnerabilities, human vulnerabilities, cross-site scripting vulnerabilities, insecure dependencies, unpublished URLs, injection vulnerabilities, exploit date vulnerabilities, broken authentication vulnerabilities, buffer overflow vulnerabilities, and the like. However, a vulnerability in third-party software component 102 may or may not create a vulnerability in the application utilizing third-party software component 102, depending on how the software component is configured or invoked.

At step 306, security vulnerability monitor 210 stores 224 the first list of known vulnerabilities 2041 corresponding to at least a portion of the plurality of third-party software components 102 in a database 250 stored in a memory 436, for example. At step 308, after a first period of time, each of the plurality of third-party software components 102 are automatically analyzed for newly-discovered vulnerabilities by a vulnerability analyzer 220 of the security vulnerability monitor 210 to produce a second list of known vulnerabilities 2042. The first period of time may be a predetermined period of time or a user adjustable period of time. Second list of known vulnerabilities 2042 may include an updated list of the latest known vulnerabilities corresponding to at least a portion of the plurality of third-party software components 102.

As noted above, the types of vulnerabilities identified in the list of known vulnerabilities 204 may include, but is not limited to, security configuration vulnerabilities, network vulnerabilities, operating system vulnerabilities, process/procedural vulnerabilities, human vulnerabilities, cross-site scripting vulnerabilities, insecure dependencies, unpublished URLs, injection vulnerabilities, exploit date vulnerabilities, broken authentication vulnerabilities, buffer overflow vulnerabilities, and the like. However, a vulnerability in third-party software component may or may not create a vulnerability in the application utilizing the third-party software component, depending on how the software component is configured or invoked.

In certain exemplary embodiments, automatically analyzing each of the plurality of third-party software components 102 identified in the SBOM for known vulnerabilities may include querying at least one external vulnerability database

470 for known vulnerabilities of each of the plurality of third-party components identified in any of the SBOMs. In some embodiments, a plurality of external vulnerability databases 470 may be queried for known vulnerabilities of each of the plurality of third-party components 102 identified in SBOM 100 to provide a compiled second list 204 of the latest known vulnerabilities (i.e., second list 2042). For example, the plurality of external vulnerability databases 470 may include at least one of a National Vulnerability Database (NVD) maintained by the United States National Institutes of Standards and Technology, a Sonatype open source security (OSS) index, a GitHub Security Advisories (GHSA) database, a Snyk vulnerability database, or a common vulnerabilities and exposures (CVE) database.

At step 310, security vulnerability monitor 210 may store 224 second list 2042 corresponding to at least the portion of the plurality of third-party software components 102 in database 250 stored in memory 436, for example. At step 312, second list 2042 is used 226 by a vulnerabilities comparer 230 to compare it with first list 2041 of known vulnerabilities retrieved 228 from database 250.

If second list 2042 does not match first list 2041, then one or more new vulnerabilities 232 have been found. In response to second list 2042 differing from first list 2041, a new vulnerability notifier 240 of security vulnerability monitor 210 may transmit, through a network 420, a notification 242 identifying a first set of differences in vulnerabilities between second list 2042 and first list 2041, at step 314. That is, the one or more new vulnerabilities 232 may be identified and transmitted in notification 242 to one or more remote computing devices 244, such as, for example, computing devices 244a, 244b, 244c, via email, text message, phone call, or any other suitable means of communicating notification 242. In some embodiments, the one or more new vulnerabilities 232 may be identified and transmitted to one or more remote computing devices 244 using a variety of means of communication based on configuration settings associated with each of computing devices 244.

After notification 242 identifying the one or more new vulnerabilities 232 is transmitted by new vulnerability notifier 240 through network 420 to one or more computing devices 244, security vulnerability monitor 210 may return to step 308, and after a second period of time, each of the plurality of third-party software components 102 may be automatically analyzed for newly-discovered vulnerabilities by vulnerability analyzer 220 to produce a third list 2043 of known vulnerabilities. The third list 2043 may include the latest known vulnerabilities corresponding to at least a portion of the plurality of third-party software components 102.

Similarly, if, at step 312, it is determined that second list 2042 is identical to first list 2041, new vulnerability notifier 240 does not send notification 242, but rather security vulnerability monitor 210 may return to step 308 and after a second period of time, each of the plurality of third-party software components 102 may be automatically analyzed for newly-discovered vulnerabilities by vulnerability analyzer 220 to produce an updated list of known vulnerabilities 204N.

In certain embodiments, it should be understood that the first period of time and the second period of time may be equal. While in other embodiments, the first period of time and the second period of time may be different.

Further, in some embodiments, an updated list 204N of the latest known vulnerabilities may be compared to first list 104 and differences between the updated list of the latest known vulnerabilities and first list 2041 that has been previously notified to one or more remote computing devices 244 may be removed from the list of newly identified vulnerabilities. Consequently, previously reported vulnerabilities may be omitted from a subsequent notification identifying a set of differences in vulnerabilities between the updated list of the latest known vulnerabilities and first list 2041.

For example, after a second period of time, each of the plurality of third-party software components identified in the SBOM may be automatically analyzed for newly-discovered vulnerabilities. A third list 2043 of known vulnerabilities corresponding to at least a portion of the plurality of third-party software components 102 may be complied and stored in memory 436, for example. The third list 2043 of known vulnerabilities may be compared with first list 2041 of known vulnerabilities. And, in response to the third list 2043 differing from first list 2041, a notification identifying a second set of differences in vulnerabilities may be transmitted through network 420, where the second set of differences in vulnerabilities comprises a difference between the third list 2043 and first list 2041 of known vulnerabilities less the first set of differences in vulnerabilities between second list 2042 and first list 2041.

However, in other embodiments, an updated list 204N of the latest known vulnerabilities may be compared to a most recently saved list 204N-1 of vulnerabilities and may be included as the one or more new vulnerabilities 232 identified and transmitted in notification 242 to one or more remote computing devices 244 a user via email, text message, phone call, or any other suitable means of communication.

For example, after a second period of time, each of the plurality of third-party software components 102 identified in SBOM may be automatically analyzed for newly-discovered vulnerabilities. A third list 2043 of known vulnerabilities corresponding to at least a portion of the plurality of third-party software components 102 may be complied and stored in database 250 stored in memory 436, for example. The third list 2043 of known vulnerabilities may be compared with second list 2042 of known vulnerabilities. And, in response to the third list 2043 differing from second list 2042, a notification identifying a second set of differences in vulnerabilities may be transmitted through network 420, where the second set of differences in vulnerabilities comprises a difference between the third list 2043 of known vulnerabilities and second list 2042 of known vulnerabilities.

It should be understood that security vulnerability monitor 210 may be a software tool that automatically runs on a continuous, a near continuous, or a regular basis (e.g., hourly, several times a day, daily, every other day, weekly, or any other useful period of time) to scan online databases for newly-discovered vulnerabilities.

Referring to FIG. 4, an exemplary computing environment 400 is shown that can be utilized through programming to implement any of the processing thus far described. The computing environment 400 may comprise a computer 412 including a system bus 424 that couples a video interface 426, network interface 428, one or more serial ports 432, a keyboard/mouse interface 434, and a system memory 436 to a Central Processing Unit (CPU) 438. Computer 412 may also include a Graphics Processing Unit (GPU) or one or more other special or general purpose processing units. A monitor or display 440 is connected to bus 424 by video interface 426 and provides the user with a graphical user interface to view, edit, and otherwise manipulate items displayed on computer 412. The graphical user interface allows the user to enter commands and information into computer 412 using a keyboard 441 and a user interface selection device 443, such as a mouse or other pointing device. Keyboard 441 and user interface selection device are connected to bus 424 through keyboard/mouse interface 434. The display 440 and user interface selection device 443 are used in combination to form the graphical user interface which may allow a user to implement at least a portion of the present invention. Other peripheral devices may be connected to computer 412 through serial port 432 or universal serial bus (USB) drives 445 to transfer information to and from computer 412.

The system memory 436 is also connected to bus 424 and may include read only memory (ROM), random access memory (RAM), an operating system 444, a basic input/ output system (BIOS) 446, application programs 448 and program data 450. The computer 412 may further include a hard disk drive 452 for reading from and writing to a hard disk, a magnetic disk drive 454 for reading from and writing to a removable magnetic disk (e.g., floppy disk), and an optical disk drive 456 for reading from and writing to a removable optical disk (e.g., CD ROM or other optical media). The computer 412 may also include USB drives 445 and other types of drives for reading from and writing to flash memory devices (e.g., compact flash, memory stick/ PRO and DUO, SD card, multimedia card, smart media card), and a scanner 458 for scanning items such as digital images to be downloaded to computer 412. A hard disk interface 452a, magnetic disk drive interface 454a, an optical drive interface 456a, a USB drive interface 445a, and a scanner interface 458a operate to connect bus 424 to hard disk drive 452, magnetic disk drive 454, optical disk drive 456, USB drive 445 and a scanner 458, respectively. Each of these drive components and their associated computer- readable media may provide computer 412 with non-volatile storage of computer-readable instruction, program modules, data structures, application programs, an operating system, and other data for the computer 412. In addition, it will be understood that computer 412 may also utilize other types of computer-readable media in addition to those types set forth herein, such as digital video disks, random access memory, read only memory, other types of flash memory cards, magnetic cassettes, and the like.

Network interface 428 provides a communication path 460 between bus 424 and network 420, which allows notifications, information and other data to be communi- cated through network 420 from any of the previously identified devices, and optionally saved in a memory, to the computer 412. This type of logical network connection is commonly used in conjunction with a local area network. Images may also be communicated from bus 424 through a communication path 462 to network 420 using serial port 432 and a modem 464. Using a modem connection between the computer 412 and other computing devices, databases, or the like may be used in conjunction with a wide area network or the Internet. It will be appreciated that the network connections shown herein are merely exemplary, and it is within the scope of the present invention to use other types of network connections between computer 412 and other computing devices including both wired and wireless connections.

As discussed above, embodiments of the present inven- tion provide improved methods and a security vulnerability monitor for automatically and continuously monitoring security vulnerabilities in software applications with third-party components and reporting newly-discovered vulner- abilities in the third-party components used by a specified software application.

Computer program code for carrying out operations of the present invention may be written in any combination of one or more programming languages, including an object-ori- ented programming language such as Java, Smalltalk, C++ or the like and conventional procedural programming lan- guages, such as the "C" programming language or similar programming languages. The program code may execute entirely on the user's computer, partly on the user's com- puter, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connec- tion may be made to an external computer (for example, though the Internet using an Internet Service Provider).

Based on the foregoing, method, computer system, and program product have been disclosed in accordance with the present invention. However, numerous modifications and substitutions can be made without deviating from the scope of the present invention. Therefore, the present invention has been disclosed by way of example and not limitation.

What is claimed is:

1. A computer-implemented method for continuously monitoring for and reporting newly-discovered vulnerabili- ties in a plurality of third-party software components used in a software application, the method comprising:

receiving a software bill of materials (SBOM) of the software application comprising the plurality of third- party software components;

automatically analyzing each of the plurality of third- party software components of the SBOM for known vulnerabilities and generating a first list of known vulnerabilities;

storing the first list of known vulnerabilities for the software application;

automatically analyzing, after a first period of time, each of the plurality of third-party software components identified in the SBOM for newly-discovered vulner- abilities;

storing a compiled second list of known vulnerabilities for the software application from the newly-discovered vulnerabilities;

comparing the compiled second list of known vulnerabili- ties with the first list of known vulnerabilities; and in response to the compiled second list differing from the first list of known vulnerabilities, transmitting, through a network, a first notification identifying a first set of differences in vulnerabilities between the compiled second list and the first list of known vulnerabilities.

2. The computer-implemented method of claim 1, further comprising:

automatically analyzing, after a second period of time, each of the plurality of third-party software compo- nents identified in the SBOM for newly-discovered vulnerabilities;

storing a complied third list of known vulnerabilities for the software application;

comparing the compiled third list of known vulnerabilities with the first list of known vulnerabilities; and in response to the compiled third list differing from the first list of known vulnerabilities, transmitting, through a network, a second notification identifying a second set of differences in vulnerabilities, wherein the second set of differences in vulnerabilities comprises a difference between the compiled third list of known vulnerabilities and the first list of known vulnerabilities less the first set of differences in vulnerabilities between the compiled second list and the first list of known vulnerabilities, and wherein the first period of time and the second period of time are equal.

3. The computer-implemented method of claim 1, further comprising:

automatically analyzing, after a second period of time, each of the plurality of third-party software components identified in the SBOM for newly-discovered vulnerabilities;

storing a compiled third list of known vulnerabilities for the software application from the newly-discovered vulnerabilities;

comparing the compiled third list of known vulnerabilities with the compiled second list of known vulnerabilities; and in response to the compiled third list differing from the compiled second list, transmitting, through a network, a second notification identifying a second set of differences in vulnerabilities, wherein the second set of differences in vulnerabilities comprises a difference between the compiled third list of known vulnerabilities and the compiled second list of known vulnerabilities, and wherein the first period of time and the second period of time are equal.

4. The computer-implemented method of claim 1, wherein automatically analyzing each of the plurality of third-party software components identified in the SBOM for known vulnerabilities comprises:

querying at least one external vulnerability database for known vulnerabilities of each third-party component identified in the SBOM.

5. The computer-implemented method of claim 4, wherein querying the at least one external vulnerability database for known vulnerabilities of each third-party component identified in the SBOM comprises querying a plurality of external vulnerability databases for known vulnerabilities of each third-party component identified in the SBOM.

6. The computer-implemented method of claim 5, wherein the plurality of external vulnerability databases comprise at least one of a National Vulnerability Database (NVD) maintained by the United States National Institutes of Standards and Technology, a Sonatype open source security (OSS) index, a GitHub Security Advisories (GHSA) database, a Snyk vulnerability database, or a common vulnerabilities and exposures (CVE) database.

7. A computer system for continuously monitoring for and reporting newly-discovered vulnerabilities in a plurality of third-party software components used in a software application, the system comprising:

one or more computer processors;

one or more computer-readable storage media;

program instructions stored on the computer-readable storage media for execution by at least one of the one or more processors, the program instructions comprising:

program instructions to:

receive a software bill of materials (SBOM) of the software application comprising the plurality of third-party software components;

automatically analyze each of the plurality of third-party software components of the SBOM for known vulnerabilities and generate a first list of known vulnerabilities;

store the first list of known vulnerabilities for the software application;

automatically analyze, after a first period of time, each of the plurality of third-party software components of the SBOM for newly-discovered vulnerabilities;

store a compiled second list of known vulnerabilities for the software application from the newly-discovered vulnerabilities;

compare the compiled second list of known vulnerabilities with the first list of known vulnerabilities; and in response to the compiled second list differing from the first list of known vulnerabilities, transmit, through a network, a first notification identifying a first set of differences in vulnerabilities between the compiled second list and the first list of known vulnerabilities.

8. The system of claim 7, wherein the program instructions further comprise program instructions to:

automatically analyze, after a second period of time, each of the plurality of third-party software components identified in the SBOM for newly-discovered vulnerabilities;

store a compiled third list of known vulnerabilities for the software application from the newly-discovered vulnerabilities;

compare the compiled third list of known vulnerabilities with the first list of known vulnerabilities; and in response to the compiled third list differing from the first list of known vulnerabilities, transmit, through the network, a second notification identifying a second set of differences in vulnerabilities, wherein the second set of differences in vulnerabilities comprises a difference between the compiled third list of known vulnerabilities and the first list of known vulnerabilities less the first set of differences in vulnerabilities between the compiled second list and the first list of known vulnerabilities, and wherein the first period of time and the second period of time are equal.

9. The system of claim 7, wherein the program instructions further comprise program instructions to:

automatically analyze, after a second period of time, each of the plurality of third-party software components identified in the SBOM for newly-discovered vulnerabilities;

store a compiled third list of known vulnerabilities for the software application from the newly-discovered vulnerabilities;

compare the compiled third list of known vulnerabilities with the compiled second list of known vulnerabilities; and in response to the compiled third list differing from the compiled second list, transmit, through the network, a second notification identifying a second set of differences in vulnerabilities, wherein the second set of differences in vulnerabilities comprises a difference between the compiled third list of known vulnerabilities and the compiled second list of known vulnerabilities, and wherein the first period of time and the second period of time are equal.

10. The system of claim 7, wherein the program instructions to automatically analyze each of the plurality of third-party software components identified in the SBOM for known vulnerabilities comprise instructions to:

query at least one external vulnerability database for known vulnerabilities of each third-party component identified in the SBOM.

11. The system of claim 10, wherein the program instructions to query the at least one external vulnerability database for known vulnerabilities of each third-party component identified in the SBOM comprise instructions to query a plurality of external vulnerability databases for known vulnerabilities of each third-party component identified in the SBOM.

12. The system of claim 11, wherein the plurality of external vulnerability databases comprise at least one of a National Vulnerability Database (NVD) maintained by the United States National Institutes of Standards and Technology, a Sonatype open source security (OSS) index, a GitHub Security Advisories (GHSA) database, a Snyk vulnerability database, or a common vulnerabilities and exposures (CVE) database.

13. The computer system of claim 7 wherein the program instructions further comprise instructions to compile a list of vulnerabilities that have been notified to a remote computing device, and vulnerabilities that have not been notified to a remote computing device, and wherein the program instructions further comprise instructions to remove from the first list of known vulnerabilities that have been notified to the remote computing device.

14. The computer system of claim 7 wherein the program instructions further comprise instructions to generate a third list of known vulnerabilities;

compare the third list of known vulnerabilities with the first list of known vulnerabilities;

in response to the third list differing from the first list, transmit, through a network, a second notification identifying a second set of differences, wherein the second set of differences comprises a difference between the third list and the first list, less the first set of differences in vulnerabilities between the second list and the first list.

15. The computer system of claim 7 wherein the program instructions further comprise instructions to remove from a notification to a remote computing device vulnerabilities that have already been included in a previous notification regarding vulnerabilities.

16. A computer program product for continuously monitoring for and reporting newly-discovered vulnerabilities in a plurality of third-party software components used in a software application, the computer program product comprising a non-transitory computer readable storage medium having program code embodied therewith, the program code executable by a processor to:

receive a software bill of materials (SBOM) of the software application comprising a plurality of third-party software components;

automatically analyze each of the plurality of third-party software components of the SBOM for known vulnerabilities and generate a first list of known vulnerabilities;

store the first list of known vulnerabilities for the software application;

automatically analyze, after a first period of time, each of the plurality of third-party software components of the SBOM for newly-discovered vulnerabilities;

store a compiled second list of known vulnerabilities for the software application from the newly-discovered vulnerabilities;

compare the compiled second list of known vulnerabilities with the first list of known vulnerabilities; and in response to the compiled second list differing from the first list of known vulnerabilities, transmit, through a network, a first notification identifying a first set of differences in vulnerabilities between the compiled second list and the first list of known vulnerabilities.

17. The computer program product of claim 16, wherein the computer program product further comprises program code to:

automatically analyze, after a second period of time, each of the plurality of third-party software components identified in the SBOM for newly-discovered vulnerabilities;

store a compiled third list of known vulnerabilities for the software application from the newly-discovered vulnerabilities;

compare the compiled third list of known vulnerabilities with the first list of known vulnerabilities; and in response to the compiled third list differing from the first list of known vulnerabilities, transmit, through the network, a second notification identifying a second set of differences in vulnerabilities, wherein the second set of differences in vulnerabilities comprises a difference between the compiled third list of known vulnerabilities and the first list of known vulnerabilities less the first set of differences in vulnerabilities between the compiled second list and the first list of known vulnerabilities, and wherein the first period of time and the second period of time are equal.

18. The computer program product of claim 16, wherein the computer program product further comprises program code to:

automatically analyze, after a second period of time, each of the plurality of third-party software components identified in the SBOM for newly-discovered vulnerabilities;

store a compiled third list of known vulnerabilities for the software application from the newly-discovered vulnerabilities;

compare the compiled third list of known vulnerabilities with the compiled second list; and in response to the compiled third list differing from the compiled second list, transmit, through the network, a second notification identifying a second set of differences in vulnerabilities, wherein the second set of differences in vulnerabilities comprises a difference between the compiled third list of known vulnerabilities and the compiled second list of known vulnerabilities, and wherein the first period of time and the second period of time are equal.

19. The computer program product of claim 16, wherein the program code to automatically analyze each of the plurality of third-party software components identified in the SBOM for known vulnerabilities comprise program code to query at least one external vulnerability database for known vulnerabilities of each third-party component identified in the SBOM.

20. The computer program product of claim 19, wherein the program code to query the at least one external vulnerability database for known vulnerabilities of each third-party component identified in the SBOM comprise code to query a plurality of external vulnerability databases for known vulnerabilities of each third-party component identified in the SBOM.

21. The computer program product of claim 20, wherein the plurality of external vulnerability databases comprise at least one of a National Vulnerability Database (NVD) maintained by the United States National Institutes of Standards and Technology, a maven sonaonatype open source security (OSS) index, a GitHub Security Advisories (GHSA) database, a Snyk vulnerability database, or a common vulnerabilities and exposures (CVE) database.

* * * * *